United States Patent [19]

Shimada

[11] Patent Number: 4,722,760
[45] Date of Patent: Feb. 2, 1988

[54] PROCESS FOR MANUFACTURING A TRIM COVER ASSEMBLY OF A SEAT

[75] Inventor: Makoto Shimada, Akishima, Japan

[73] Assignee: Tachikawa Spring Co., Ltd., Tokyo, Japan

[21] Appl. No.: 887,949

[22] Filed: Sep. 2, 1986

Related U.S. Application Data

[63] Continuation of Ser. No. 786,480, Oct. 11, 1985, abandoned.

[30] Foreign Application Priority Data

Oct. 31, 1984 [JP] Japan .................... 59-165439

[51] Int. Cl.⁴ .................... B32B 3/30; B32B 3/00; B32B 3/16
[52] U.S. Cl. .................... 156/214; 156/212; 156/219; 156/220; 156/228; 156/230; 156/232; 428/160; 428/163; 428/167
[58] Field of Search .................... 156/228, 230, 232, 214, 156/212, 219, 220, 209; 428/159, 160, 163, 167, 173

[56] References Cited

U.S. PATENT DOCUMENTS

| | | | |
|---|---|---|---|
| 2,797,179 | 6/1957 | Reynolds et al. | 156/219 X |
| 3,016,317 | 1/1962 | Brunner | 428/163 |
| 3,265,551 | 8/1966 | Ananian et al. | 156/219 |
| 4,323,410 | 4/1982 | Urai | 156/228 |
| 4,480,715 | 11/1984 | Brooks . | |
| 4,541,885 | 9/1985 | Caudill, Jr. | 428/316.6 |
| 4,619,725 | 10/1986 | Muraishi et al. | 156/228 X |

FOREIGN PATENT DOCUMENTS 56-63388 10/1979 Japan .

Primary Examiner—Robert A. Dawson
Assistant Examiner—Jeff H. Aftergut
Attorney, Agent, or Firm—Cushman, Darby & Cushman

[57] ABSTRACT

A process for manufacturing a trim cover assembly constituting the surface of an automotive seat or airplane seat is disclosed and comprises the step of forming a covering material and a foam wadding with a plurality of recessed grooves on the surface thereof. The process also includes the step of forming the covering material in the trim cover assembly by a thermal press or the like into a predetermined uneven configuration. Then, the thus-formed covering material is adhesively bonded to the surface of the foam wadding so that various kinds of uneven configurations are available for use as the surface of the trim cover assembly.

1 Claim, 6 Drawing Figures

PROCESS FOR MANUFACTURING A TRIM COVER ASSEMBLY OF A SEAT

CROSS-REFERENCE TO RELATED APPLICATION

This application is a continuation of U.S. patent application Ser. No. 786,480 filed Oct. 11, 1985 and now abandoned.

BACKGROUND OF THE INVENTION

1. Field of the Invention

The present invention relates to a process for manufacturing a trim cover assembly of a seat for use in an automobile or the like, and, more particularly, to such manufacturing process for the trim cover assembly in which a covering material is adhesively bonded to the surface of a foam wadding formed with a large number of conveniently spaced, recessed grooves.

2. Description of the Related Art

This type of trim cover assembly is a component which constitutes the surface of a seat, and, as shown in FIG. 4, a conventional trim cover assembly of this type is excellent in appearance because it has a plurality of decorative recessed strips (a)(a) on the surface thereof.

The conventional trim cover assembly (A') in FIG. 4 is generally a laminated body including a covering material (11), a wadding (12) formed of foam material, and a wadding cover (13). The wadding (12) is formed on the side of the covering material (11) with a large number of suitably spaced, recessed grooves (12a)(12a) shown in FIG. 6. The covering material (11) and the wadding cover (13) are machine sewn along the lower edges of these recessed grooves (12a)(12a) to be combined integrally as shown in FIG. 5. As a result of this machine sewing, the covering material (11) is fixed along the outside configuration of the wadding (12) so as to provide the trim cover assembly (A') with the above-mentioned decorative recessed stripes (a) on the surface thereof.

The recessed grooves (12a)(12a) of the above-mentioned wadding (12) are formed by machining or cutting with a rooter the material of the wadding (12), that is, the flat-plate-like slab material. Consequently, the whole trim cover assembly (A') presents a flat-plate-like configuration, while the above-mentioned recessed stripes (a)(a) each present a square and inverted U-shaped configuration. Therefore, the trim cover assembly (A') offers only a limited surface configuration, and thus it is disadvantageous in that it fails to provide a fine appearance full of variety and excellent in design.

To eliminate the above-mentioned disadvantage, the surface of the wadding (12) may be cut into an uneven configuration (e.g., an R-shaped configuration) after or at the same time when the recessed grooves (12a)(12a) are cut and formed.

This method, however, is not actually put into practice since it is quite poor in operationability and very expensive.

SUMMARY OF THE INVENTION

The present invention aims at eliminating the drawbacks in the above-mentioned conventional trim cover assembly. Accordingly, it is a primary object of the invention to provide a trim cover assembly which has a desired configuration, such as an R-shaped configuration or the like, on the surface thereof without performing any other cutting operations than the above-mentioned rooter cutting operation to form the recessed grooves in the wadding (12) as in the prior art trim cover assembly.

In order to attain the above object, according to the invention, with a wadding not machined, a covering material has been previously formed by a thermal press or the like in a predetermined configuration. The wadding is bonded to the thus-formed covering material by adhesives so as to form a trim cover assembly. Therefore, the wadding can be changed in shape along the configuration of the covering material and the changing status thereof can be maintained by the adhesives, so that the resultant trim cover assembly can present various kinds of uneven configurations on the surface thereof according to desired cases.

The above-mentioned adhesives may be urethane adhesives having a permeability so as to improve the permeability of a seat to which the trim cover assembly of the invention is applied.

The above and other objects and advantages of the invention may be readily ascertained by referring to the following description and appended drawings.

DETAILED DESCRIPTION OF A PREFERRED EMBODIMENT OF THE INVENTION

Figure 1:
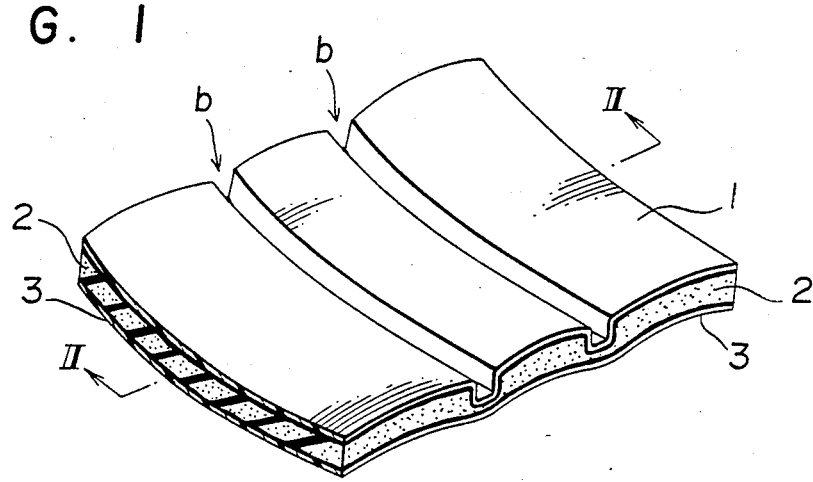
FIG. 1 is a perspective view, cut away in part, of the invention.
Figure 2:
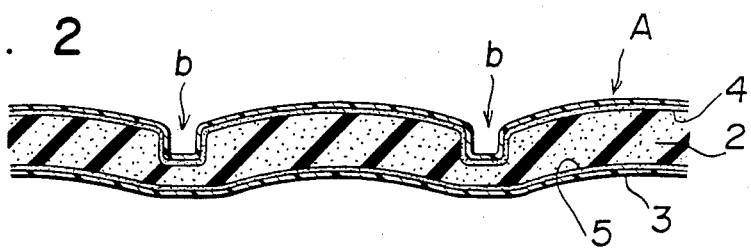
FIG. 2 is a sectional view taken along line II—II in FIG. 1.
Figure 3:
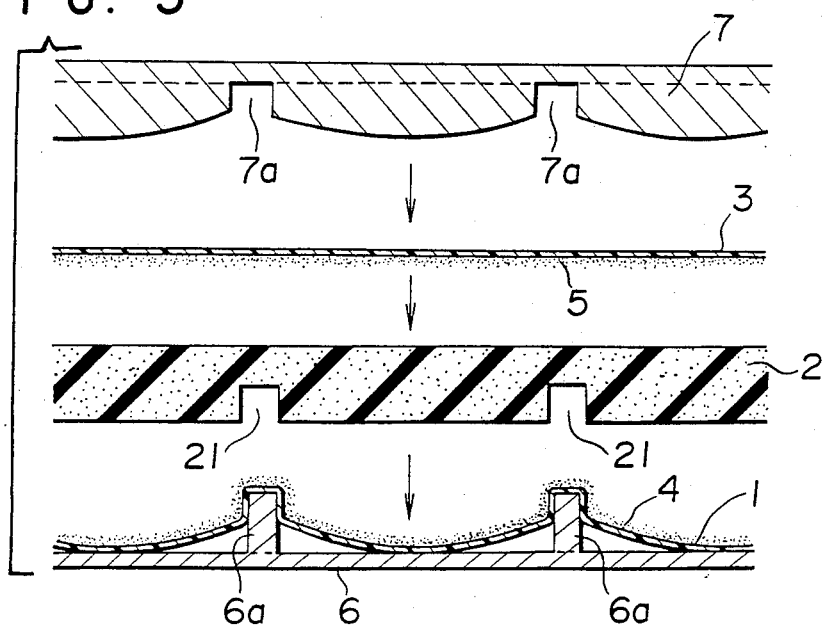
FIG. 3 shows sectional views to illustrate how the invention is formed.
Figure 4:
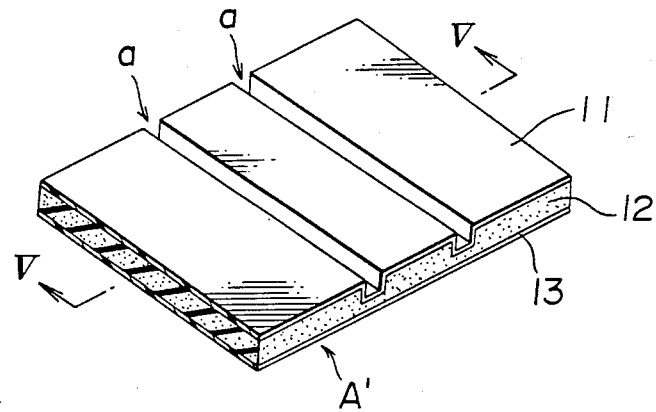
FIG. 4 is a perspective view, cut away in part, of a prior art trim cover assembly.
Figure 5:
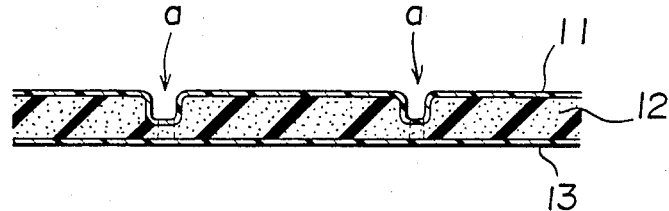
FIG. 5 is a sectional view taken along line V—V in FIG. 4.
Figure 6:
FIG. 6 is a sectional view of a wadding which is used commonly in the present invention and in the prior art.

Referring first to FIG. 1, there is illustrated a trim cover assembly (A) constructed in accordance with the present invention. There are recessed stripes (b)(b) for decoration, a covering material (1), a wadding (2) formed of foam material, and a wadding cover (3). As shown in FIG. 2, the wadding (2) is bonded to the covering material (1) by an adhesive (4), and the wadding cover (3) is bonded by the adhesive (5) similarly to the wadding (2). It should be noted that the wadding cover (3) may be laminated or coated to the back surface of the wadding (2) in an arbitrary manner.

In the above-mentioned trim cover assembly (A), as shown in FIG. 1, the portions thereof disposed between the recessed stripes (b)(b) are curved outwardly in a direction perpendicular to the direction of the recessed stripes (b)(b), and each of the recessed stripes (b)(b) presents a rounder shape than the above-mentioned conventional ones. This shape occurs because the trim cover assembly (A) is constructed in such a method as described below in detail.

In other words, first, a lower mold (6), which is provided with projections (6a)(6a) to be fitted into recessed grooves (21)(21) formed in the wadding (2), is prepared, and an upper mold (7), which is formed with recessed cavities (7a)(7a) and has suitably shaped surfaces facing toward the wadding (2), is also prepared.

Next, the lower and upper molds (6) and (7) are operated to press against the covering material (1) and form it into a predetermined uneven (that is, projected-and-recessed) configuration. Thereafter, the adhesive (4) is applied to the covering material (1) or to the contact surface of the wadding (2) to be contacted with the covering material (1). The covering material (1), wadding (2) and wadding cover (3) with an adhesive (5) are piled up on one another sequentially, and are then pressed by the upper mold (7), so that the respective components (1), (2), and (3) are bonded to one another. As a result of this bonding, the trim cover assembly (A) illustrated in FIG. 1 is produced.

The respective parts of the trim cover assembly (A) are formed of the same materials as employed in the prior art trim cover assembly of this type. For example, the above-mentioned covering material (1) is formed of a film having a flexibility such as vinyl chloride, or a textile fabric; the wadding (2) is formed of urethane foam formed with the recessed grooves (21)(21) which are cut or machined by the rooter as in the conventional wadding; and the wadding cover (3) is formed of a nonwoven fabric. Also, the above-mentioned adhesives are formed of permeable urethane.

According to the invention, as described hereinbefore, since the covering material is press-formed into a desired configuration and the foam wadding is adhesively bonded to the thus-formed covering material, it is possible to provide such a trim cover assembly having a surface configuration substantially in alignment with or similar to the surface configuration of the covering material. Therefore, the trim cover assembly of the invention has more variety in its surface configurations and is also of higher commercial value than the above-mentioned conventional trim cover assembly which is provided in a flat-plane-like surface thereof with a plurality of square and inverted-U-shaped decorative recessed stripes. Also, in the invention, various kinds of surface configurations can be provided simply by changing one of the press molds. Further, since the invention can be produced without cutting or machining the wadding into an R-shaped configuration or the like, it is excellent in workability and also can be supplied at lower costs.

What is claimed is:

1. A process for manufacturing a trim cover assembly for a seat including a cover material, a foam wadding and a wadding cover, comprising the steps of:

forming a large number of suitably spaced-apart recessed grooves on the surface of said foam wadding;

placing said cover material on a lower mold having a plurality of projections corresponding to said suitably spaced-apart recessed grooves of said foam wadding;

lowering and pressing an upper mold against said cover material and said lower mold, said upper mold including a plurality of recessed cavities corresponding to respective projections of said lower mold and further having a predetermined shaped surface including curved portions between said recessed cavities so as to form said cover material into a predetermined uneven configuration including an outwardly curved configuration between spaced-apart recessed grooves whereby the thus formed cover material has arc-shaped projecting portions in cross-section;

applying an adhesive to said cover material;

placing said foam wadding on the formed cover material on said lower mold with the recessed surface of said foam wadding facing said formed cover material;

applying an adhesive to at least one of said wadding cover and said foam wadding and placing said wadding cover on said foam wadding; and pressing said upper mold against said wadding cover, said foam wadding, and said cover material so that same are bonded into a unitary structure, whereby, a trim cover assembly is formed having a desired uneven configuration and wherein said foam wadding is distorted in shape so as to conform to said uneven configuration of said cover material.

* * * * *